US012361911B2

(12) United States Patent
Wu et al.

(10) Patent No.: US 12,361,911 B2
(45) Date of Patent: Jul. 15, 2025

(54) CONTROL DEVICE AND RELATED DISPLAY SYSTEM

(71) Applicant: REALTEK SEMICONDUCTOR CORPORATION, Hsinchu (TW)

(72) Inventors: Cian-Rou Wu, Hsinchu County (TW); Cheng Yueh Chen, Hsinchu County (TW); Chun-Chieh Chan, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 241 days.

(21) Appl. No.: 18/191,459

(22) Filed: Mar. 28, 2023

(65) Prior Publication Data

US 2023/0419920 A1 Dec. 28, 2023

(30) Foreign Application Priority Data

Jun. 22, 2022 (TW) .................................. 111123284

(51) Int. Cl.
*G09G 5/00* (2006.01)
*G09G 5/18* (2006.01)

(52) U.S. Cl.
CPC ............... *G09G 5/005* (2013.01); *G09G 5/18* (2013.01); *G09G 2310/08* (2013.01)

(58) Field of Classification Search
CPC ....... G09G 5/005; G09G 5/18; G09G 2310/08
See application file for complete search history.

(56) References Cited

U.S. PATENT DOCUMENTS

2004/0117538 A1* 6/2004 Liu ........................ G09G 5/006 710/315
2005/0174319 A1* 8/2005 Hwang ................ G09G 3/3406 345/102
2005/0248543 A1* 11/2005 North ...................... G06F 21/88 345/173
2008/0055240 A1* 3/2008 Zhang .................. G06F 1/1601 345/156
2012/0211560 A1* 8/2012 Su .......................... G06Q 10/10 235/375
2013/0208103 A1* 8/2013 Sands .............. H04N 21/42201 726/16

FOREIGN PATENT DOCUMENTS

| | | | |
|---|---|---|---|
| TW | 200943064 | A | 10/2009 |
| TW | 201324311 | A | 6/2013 |
| TW | M619465 | U | 11/2021 |
| TW | 202205249 | A | 2/2022 |

OTHER PUBLICATIONS

English abstract translation of TW 200943064 A.
English abstract translation of TW 201324311 A.
English abstract translation of TW 202205249 A.
English abstract translation of M619465.

* cited by examiner

*Primary Examiner* — Stacy Khoo

(74) *Attorney, Agent, or Firm* — WPAT, P.C.; Anthony King

(57) ABSTRACT

A control device is configured to control a display panel according to a trigger signal transmitted from an input device to a host. The control device includes a connector unit and a signal capture unit. The connector unit is configured to receive the trigger signal, and transmit the same to the host. The signal capture unit is configured to capture the trigger signal, and control the display panel according to the trigger signal while the connector unit is transmitting the trigger signal to the host.

20 Claims, 2 Drawing Sheets

CONTROL DEVICE AND RELATED DISPLAY SYSTEM

CROSS-REFERENCE TO RELATED APPLICATIONS

This application claims the benefit of priority to Patent Application No. 111123284, filed in Taiwan on Jun. 22, 2022, which is incorporated by reference in its entirety.

TECHNICAL FIELD

The present application relates to a control device and a related display system, particularly to a control device and a related display system that captures signals from an input device.

BACKGROUND

In the field of displays, more and more application scenarios require the display to respond to input commands in real time. Therefore, how to optimize the delay of display response to input commands has become important in the related field.

SUMMARY OF THE INVENTION

An aspect of the present disclosure provides a control device is configured to control a display panel according to a trigger signal transmitted from an input device to a host. The control device includes a connector unit and a signal capture unit. The connector unit is configured to receive the trigger signal, and transmit the same to the host. The signal capture unit is configured to capture the trigger signal, and control the display panel according to the trigger signal while the connector unit is transmitting the trigger signal to the host.

Another aspect of the present disclosure provides a display system. The display system includes a panel and a control device. The control device is coupled to the panel and configured to transmit a trigger signal transmitted from an input device to a host, and control the panel according to the trigger signal while transmitting the trigger signal.

Compared to the conventional technology, the control device and related display system of the present disclosure can enhance the user experience by providing more timely processing of delay-sensitive commands.

BRIEF DESCRIPTION OF THE DRAWINGS

Various aspects of the present application can best be understood upon reading the detailed description below and accompanying drawings. Note that the various features in the drawings are not drawn to scale in accordance with standard practice in the art. In fact, the size of some features may be deliberately enlarged or reduced for discussion.

DETAILED DESCRIPTION

Figure 1:
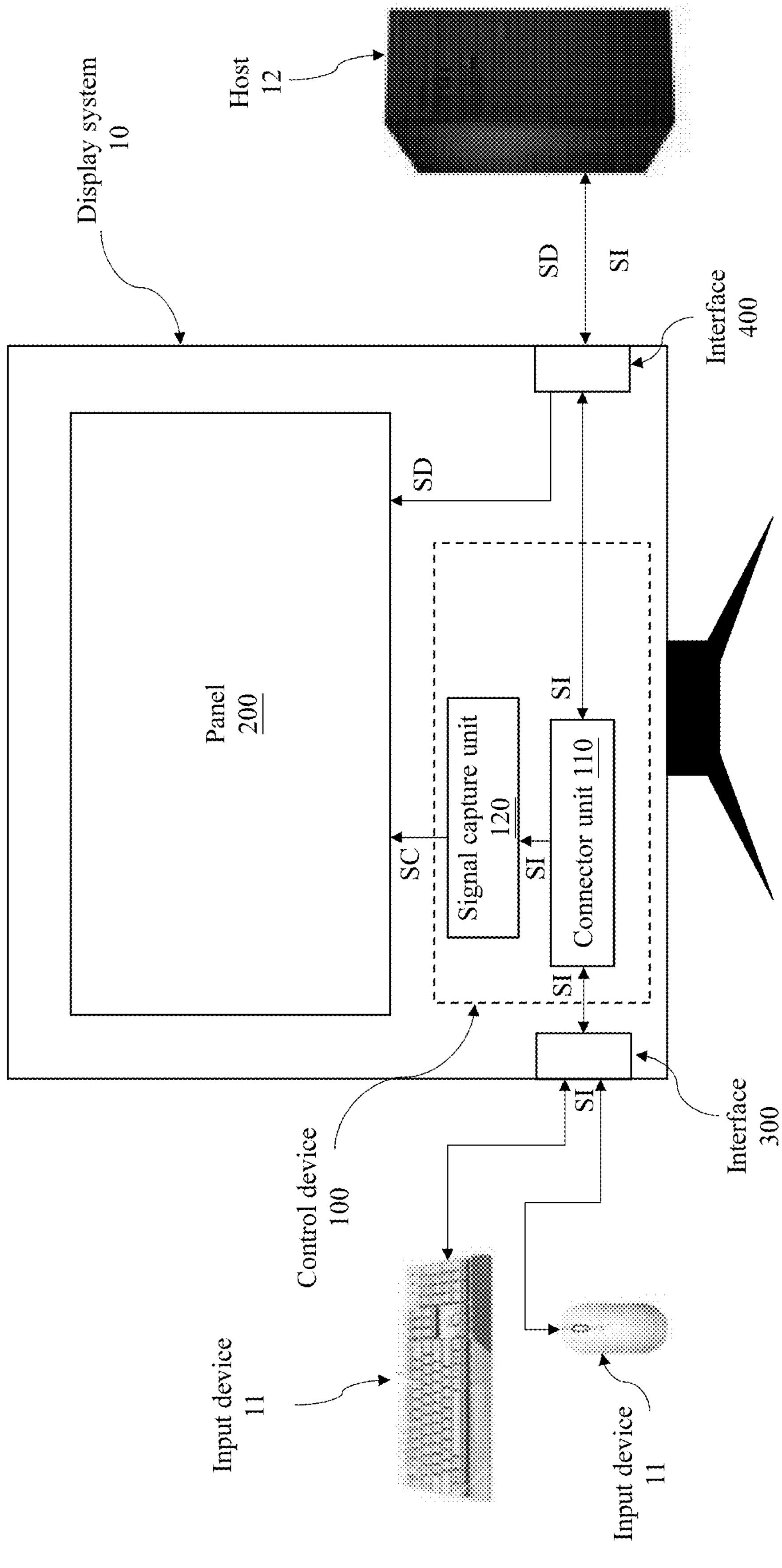
FIG. 1 is a schematic diagram illustrating a display system, input device and host according to some embodiments of the present disclosure.

FIG. 1 is a schematic diagram illustrating a display system 10, input devices 11 and a host 12 according to some embodiments of the present disclosure. The display system 10 is configured to display a display signal SD received from the host 12. The input device 11 is configured to generate a trigger signal SI, which is transmitted to the host 12 through the display system 10, and then the host 12 decodes and converts the trigger signal SI into the display signal SD, which is transmitted to the display system 10. For example, the input device 11 is a mouse, and the user clicks the left button of the mouse to generate a command for opening a window, and then the host 12 decodes the command for opening the window and correspondingly generates a screen image of an open window as the display signal SD, which is transmitted to the display system 10.

However, in some application scenarios, it takes longer to use the host 12 to decode and then generate the display signal SD, such that the user may experience a delay from generating the trigger signal SI to display the screen image. To improve the user experience, the display system 10 provided by the embodiments of the present discloser can be used to decrease the above-mentioned delay.

The display system 10 includes a control device 100, a panel 200, an interface 300 and an interface 400. The input device 11 is coupled to the interface 300, and the host 12 is coupled to the interface 400. The display system 10 communicates with the input device 11 and the host 12, respectively through the interface 300 and the interface 400. The control device 100 is coupled between the interface 300 and the interface 400, and is configured to transmit the trigger signal SI to the host 12 and the display signal SD to the panel 200.

The control device 100 includes a connector unit 110 and a signal capture unit 120. In some embodiments, the connector unit 110 is the control chip of the interface 300, and is configured to transmit the trigger signal SI in the VGA, USB, USB-C, HDMI and/or DP format. After the connector unit 110 receives the trigger signal SI from the interface 300, the trigger signal SI is transmitted to the host 12 through the interface 400. While the connector unit 110 is transmitting the trigger signal SI, the signal capture unit 120 is configured to capture the trigger signal SI. More specifically, when the signal capture unit 120 captures the trigger signal SI, the operation of the connector unit 110 transmitting the trigger signal SI is not affected. In other words, the connector unit 110 transmitting the trigger signal SI to the host 12 and the signal capture unit 120 capturing the trigger signal SI are two independent operations that can be performed simultaneously, such that the signal capture unit 120 can capture the trigger signal SI in a timely manner.

In some embodiments, the screen displayed by the panel 200 needs to respond to the trigger signal SI in a timely manner. For example, in a shooting game, the user generates the trigger signal SI to turn on the Hawkeye mode by the input device 11. Because of the fast pace of such shooting games, if the delay between the screen displayed by the panel 200 and the generation of the trigger signal SI is too long, the need to turn on the Hawkeye mode may no longer exist (for example, the target escapes from the field of view, etc.), thereby degrading the user's game result and lowering down the user's experience.

Therefore, for some special commands (such as the trigger signal SI to open Hawkeye mode), the signal capture unit 120 is used to directly decode the trigger signal SI to generate the control signal SC to the panel 200, so that the panel 200 can make a corresponding display according to the control signal SC. Compared with waiting for the host to decode the trigger signal SI to generate the display signal SD and then transmit the display signal SD to the panel 200, the time required to generate the control signal SC to the panel 200 using the signal capture unit 120 is shorter and the time delay is less significant.

In some embodiments, the control signal SC is configured to control an on-screen display (OSD) setting of the panel 200.

In some embodiments, the signal capture unit 120 is configured to identify whether the trigger signal SI includes a pre-determined data, wherein the pre-determined data is data related to the above-mentioned special commands that are sensitive to time delay. When the trigger signal SI includes the pre-determined data, it means that the input device 11 generates a trigger signal SI that needs to be responded to in a timely manner, and the signal capture unit 120 decodes the trigger signal SI to generate the control signal SC and uses the control signal SC to control the panel 200. On the contrary, when the trigger signal SI excludes the pre-determined data, the signal capture unit 120 does not decode the trigger signal SI, and hence does not control the panel 200.

In some embodiments, the trigger signal SI only takes effect after the input device 11 and the host 12 complete the handshake. Thus, the signal capture unit 120 is configured to determine whether the handshake between the input device 11 and the host 12 is completed. After the handshake is completed, the signal capture unit 120 decodes the trigger signal SI. To the contrary, when the handshake is not completed or fails, the signal capture unit 120 does not decode the trigger signal SI.

In general, in the USB format, for example, a complete transmission from the input device 11 to the host 12 consists of, in sequence, the transmission of a token packet from the host 12 to the input device 11, the transmission of a data packet from the input device 11 to the host 12, and the transmission of a handshake packet from the host 12 to the input device 11. The handshake is completed when all three packets have been transmitted. In some embodiments, the signal capture unit 120 captures the token packet, the data packet, and the handshake packet, and decodes the data packet (corresponding to the trigger signal SI) after the handshake is completed to generate the control signal SC.

In some embodiments, the trigger signal SI is an image signal, and the signal capture unit 120 is configured to determine whether a specific object exists in the image of the trigger signal SI, when the specific object exists in the image, the signal capture unit 120 generates the control signal SC to control the panel 200, to make the panel 200 perform accordingly. For example, an image signal (corresponding to the trigger signal SI) is generated during video conferencing through the camera (corresponding to the input device 11), and when a person suddenly walks into the field of view of the camera, a figure of the intruding person is generated in the image signal, and then the signal capture unit 120 generates the control signal SC to the panel 200 in accordance with the sudden appearance of the figure in the image, so as to control the panel 200 to change the background pattern originally displayed. It should be understood that the various operations of the control signal SC used to control the panel 200 are only examples, and the present disclosure is not limited thereto.

In addition, the present disclosure is not limited to various input devices 11, except for the above-mentioned mouse, keyboard, cameras, etc., but also not limited to joysticks, various sensor or other devices with signal generation functions.

In some embodiments, the connector unit 110 and the signal capture unit 120 are manufactured on the same chip, however, the present disclosure is not limited thereto, various ways of forming the connector unit 110 and the signal capture unit 120 are within the contemplated scope of the present disclosure. For example, in other embodiments as shown in FIG. 2A to FIG. 2D, the signal capture unit 120 and the other units are fabricated on a chip different from the chip of the connector unit 110.

FIG. 2A to FIG. 2D are schematic diagrams illustrating the control device 100 according to other embodiments of the present disclosure. Generally, the panel 200 is arranged with a scaler unit 130, which is configured to adjust the display signal SD to match the specification of the panel 200.

Figure 2A:
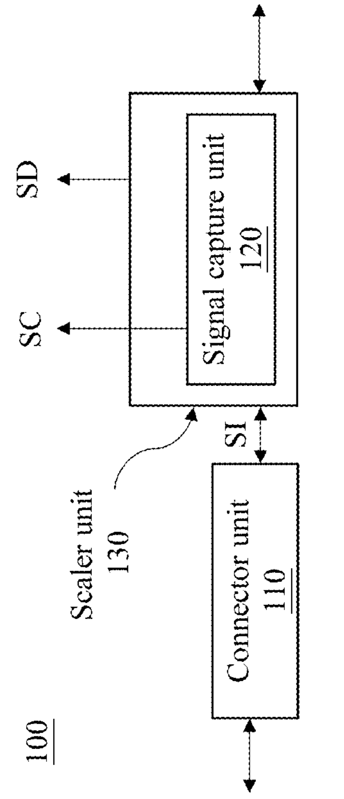
FIG. 2A, FIG. 2B, FIG. 2C and FIG. 2D are schematic diagrams illustrating a control device according to other embodiments of the present disclosure.
Figure 2B:
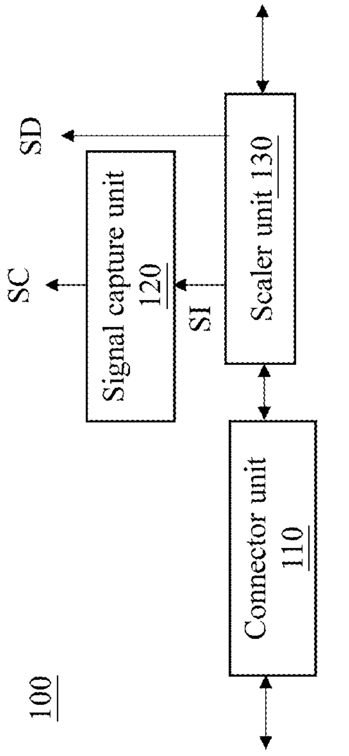

In some embodiments, the scaler unit 130 is disposed in the control device 100. The scaler unit 130 can be those shown in FIG. 2A and FIG. 2B, and the connector unit 110 is serially connected between the interface 300 and the interface 400, wherein the signal capture unit 120 captures the trigger signal SI through the scaler unit 130. In the embodiment of FIG. 2A, the signal capture unit 120 and the scaler unit 130 are disposed on the same chip. In the embodiment of FIG. 2B, the signal capture unit 120 is disposed on a chip different from the chip of the scaler unit 130, and coupled to the connector unit 110 through the scaler unit 130.

Figure 2C:
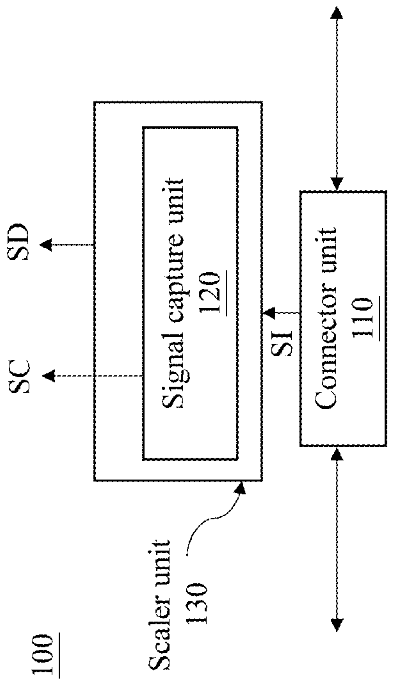
Figure 2D:
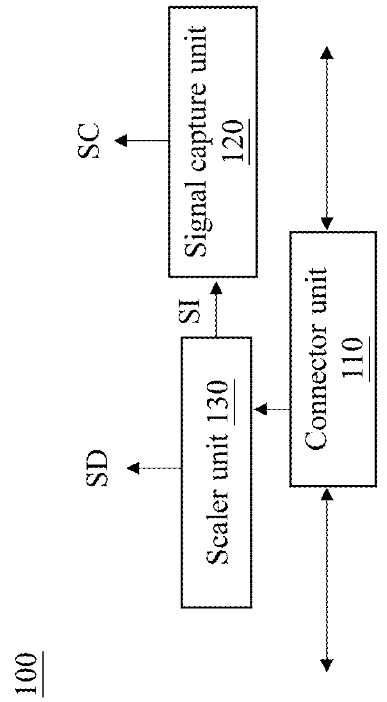

The scaler unit 130 can be those shown in FIG. 2C and FIG. 2D, which receives the trigger signal SI and the display signal SD through the connector unit 110. In the embodiment of FIG. 2C, the signal capture unit 120 and the scaler unit 130 are disposed on the same chip. In the embodiment of FIG. 2D, the signal capture unit 120 and the scaler unit 130 are disposed on different chips, and the signal capture unit 120 is coupled to the connector unit 110 through the scaler unit 130.

In alternative embodiments, the connector unit 110, the signal capture unit 120 and the scaler unit 130 are disposed on the same chip.

The foregoing outlines features of several embodiments of the present application so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A control device, configured to control a panel of a display system according to a trigger signal transmitted from an input device to a host, comprising:

a connector unit, configured to receive the trigger signal and transmit the trigger signal to the host; and a signal capture unit, configured to identify whether the trigger signal is sensitive to time delay, wherein when the trigger signal is sensitive to time delay, the signal capture unit captures the trigger signal and controls the panel according to the trigger signal while the connector unit is transmitting the trigger signal to the host, wherein when the trigger signal is not sensitive to time delay, the panel is configured to display according to a display signal, wherein the display signal is a signal decoded and converted from the trigger signal by the host.

2. The control device of claim 1, wherein after the input device and the host complete a handshake for transmitting the trigger signal, the signal capture unit controls the panel according to the trigger signal when the trigger signal is sensitive to time delay.

3. The control device of claim 2, wherein when the input device and the host do not complete the handshake for transmitting the trigger signal, the signal capture unit does not control the panel.

4. The control device of claim 1, wherein a format of the trigger signal is VGA, USB, HDMI or DP.

5. The control device of claim 1, wherein the signal capture unit is coupled to the connector unit and configured to capture the trigger signal from the connector unit when the trigger signal is sensitive to time delay.

6. The control device of claim 1, further comprising:

a scaler unit, wherein the trigger signal is transmitted to the host further through the scaler unit, wherein the signal capture unit is coupled to the scaler unit and configured to capture the trigger signal from the scaler unit when the trigger signal is sensitive to time delay.

7. The control device of claim 1, wherein the signal capture unit is configured to identify whether the trigger signal is sensitive to time delay, and wherein when the trigger signal comprises a pre-determined data, the signal capture unit determines that the trigger signal is sensitive to time delay and the signal capture unit controls the panel according to the trigger signal.

8. The control device of claim 7, wherein when the trigger signal does not comprise the pre-determined data, the signal capture unit does not control the panel.

9. The control device of claim 1, wherein the signal capture unit controls an on-screen display (OSD) setting of the panel according to the trigger signal.

10. A display system, comprising:

a panel; and a control device, coupled to the panel and configured to transmit, to a host, a trigger signal received from an input device, wherein the control device is configured to identify whether the trigger signal is sensitive to time delay, wherein when the trigger signal is sensitive to time delay, the control device controls the panel according to the trigger signal while the control device is transmitting the trigger signal, wherein when the trigger signal is not sensitive to time delay, the display system is configured to receive a display signal from the host for displaying, wherein the display signal is a signal decoded and converted from the trigger signal by the host.

11. The display system of claim 10, further comprising:

a first interface, configured to be coupled to the input device, wherein the trigger signal is transmitted to the control device through the first interface; and a second interface, configured to be coupled to the host, wherein the trigger signal is transmitted to the host through the second interface.

12. The display system of claim 11, wherein the control device comprises:

a connector unit, coupled to the first interface and configured to receive the trigger signal.

13. The display system of claim 12, wherein the control device further comprises:

a scaler unit, coupled to the connector unit and configured to transmit the trigger signal to the host, wherein the scalar unit is further configured to, when the trigger signal is sensitive to time delay, control the panel according to the trigger signal while the scaler unit is transmitting the trigger signal to the host.

14. The display system of claim 12, wherein the control device further comprises:

a scaler unit, coupled to the connector unit and configured to transmit the trigger signal to the host; and a signal capture unit, configured to capture the trigger signal when the trigger signal is sensitive to time delay, and further configured to, when the trigger signal is sensitive to time delay, control the panel according to the trigger signal while the scaler unit is transmitting the trigger signal to the host.

15. The display system of claim 14, wherein the signal capture unit is coupled between the scaler unit and the panel, wherein the signal capture unit is configured to capture the trigger signal from the scaler unit when the trigger signal is sensitive to time delay.

16. The display system of claim 14, wherein the signal capture unit is coupled between the connector unit and the panel, wherein the signal capture unit is configured to capture the trigger signal from the connector unit when the trigger signal is sensitive to time delay.

17. The display system of claim 10, wherein after the input device and the host complete a handshake for transmitting the trigger signal, the control device controls the panel according to the trigger signal.

18. The display system of claim 17, wherein when the input device and the host do not complete the handshake for transmitting the trigger signal, the control device does not control the panel according to the trigger signal.

19. The display system of claim 10, wherein the control device is configured to capture the trigger signal while the control device is transmitting the trigger signal, and wherein the control device is further configured to identify whether the trigger signal is sensitive to time delay, wherein when the trigger signal comprises a pre-determined data, the control device identifies that the trigger signal is sensitive to time delay and the control device controls the panel according to the trigger signal.

20. The display system of claim 19, wherein when the trigger signal does not comprise the pre-determined data, the control device does not control the panel according to the trigger signal.

* * * * *